3,426,070
METHOD FOR PREPARING 2 - AMINOCY-
CYLOHEXANONE OXIME AND HYDRO-
CHLORIDE THEREOF
Shunichi Doi, Tokyo, and Hidenori Tanaga and Masami
Okumura, Yokohama, Japan, assignors to Nitto Chem-
ical Industry Co., Ltd., Tokyo, Japan, a corporation of
Japan
No Drawing. Filed Nov. 23, 1966, Ser. No. 596,426
Claims priority, application Japan, Nov. 27, 1965,
40/72,775
U.S. Cl. 260—566  20 Claims
Int. Cl. C07c 131/04

ABSTRACT OF THE DISCLOSURE 2-chlorocyclohexanone is reacted with a hydroxylamine mineral acid salt in liquid ammonia to produce 2-amino-cyclohexanone oxime. A polymerization inhibitor such as hydroquinone or pyrogallol may be optionally present.

---

This invention relates to an improved method for preparing 2-aminocyclohexanone oxime and hydrochloride thereof which are intermediates for the production of lysine. More particularly, the invention pertains to a novel process for preparing 2-aminocyclohexanone oxime and its hydrochloride from 2-chlorocyclohexanone.

Several reports have heretofore been made with respect to processes for the preparation of 2-aminocyclohexanone oxime using cyclohexylamine as starting material. For example, as reported in "Journal of the American Chemical Society," vol. 76, pp. 4561–4564 (1954), H. E. Baumgarten and F. A. Bower obtained 2-aminocyclohexanone hydrochloride by preparing N,N-dichlorocyclohexylamine from cyclohexylamine and treating said compound with methanolic sodium methoxide in methanol (yield in the latter half step: 46%). Further, as reported in "Journal of Organic Chemistry," vol. 26, pp. 2567–2568 (1961), S. L. Reid and D. B. Sharp prepared 2-aminocyclohexanone oxime hydrochloride by adding hydroxylamine hydrochloride, sodium carbonate and water to 2-aminocyclohexanone hydrochloride (yield 80%). (Since this report cites the above-mentioned report of Baumgarten et al., it is presumed that the 2-aminocyclohexanone hydrochloride used in the above process was prepared in the same manner as adopted by Baumgarten et al.) However, the process using cyclohexylamine as starting material is not suitable for commercial production because the step of preparing 2-aminocyclohexanone hydrochloride from dichlorocyclohexylamine is low in yield (Baumgarten et al. report that the yield is 46%) and the starting material is expensive.

An object of the present invention is to provide a novel method for preparing 2-aminocyclohexanone oxime hydrochloride in high yield using as starting material 2-chlorocyclohexanone which has recently come to be readily obtainable at a low cost.

Another object is to provide a markedly advantageous method for the commercial production of 2-aminocyclohexanone oxime hydrochloride by effecting the amination and oxime-formation of 2-chlorocyclohexanone at one stage.

These and other objects will become apparent from the detailed explanation of invention that follows.

We have found that when a mineral acid salt of hydroxylamine and excess liquid ammonia are added to 2-chlorocyclohexanone, amination and oxime-formation occur substantially simultaneously to form 2-aminocyclohexanone oxime hydrochloride in high yield.

In accordance with the present invention, the desired product can be obtained not only in higher yield than in the conventional process but with marked economy on commercial scale. That is, according to the present invention, the formation of 2-aminocyclohexanone hydrochloride by amination of 2-chlorocyclohexanone and the formation of 2-aminocyclohexanone oxime hydrochloride by oxime-formation of 2-aminocyclohexanone hydrochloride, which respectively correspond in the conventional process using cyclohexylamine to the formation of 2-aminocyclohexanone hydrochloride from N,N-dichlorocyclohexylamine and the formation of 2-aminocyclohexanone oxime hydrochloride by oxime-formation of 2-aminocyclohexanone hydrochloride, are effected at one stage. In accordance with the present invention, therefore, not only the equipment cost can be reduced to one half the cost in the conventional process, but marked improvements can be attained both in operation and yield since 2-aminocyclohexanone, which is unstable and readily polymerizable, is not required to be taken out. All the chemicals employed in the present invention are commercially obtainable at low costs and are not particularly required to be high in purity. Further, according to the present invention, the inexpensive ammonia employed acts, in place of sodium carbonate or the like, as a neutralizing agent for the hydroxylamine mineral acid salt and, moreover, the ammonium salt formed can be easily separated from the desired product, whereby a high purity product and an ammonium salt can be obtained. Thus, the present invention gives many industrial advantages. The resulting 2-aminocyclohexanone oxime hydrochloride is subjected to Beckmann's rearrangement and is then hydrolyzed to form DL-lysine, one of the essential amino acids.

The greatest characteristic of the present invention lies in that the amination and oxime-formation of 2-chlorocyclohexanone are effected at one stage in liquid ammonia. It is, of course, possible to obtain, according to the ordinary knowledge in the organic chemistry, 2-aminocyclohexanone oxime hydrochloride by first aminating 2-chlorocyclohexanone to form 2-aminocyclohexanone hydrochloride and then subjecting said 2-aminocyclohexanone hydrochloride to oxime-formation. However, the 2-aminocyclohexanone is markedly unstable under its formation condition, i.e. at an alkaline pH, and tends to convert into 1,2,3,4,6,7,8,9-octahydrophenazine

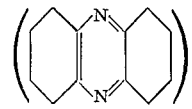

We made experiments according to the above-mentioned two stage-process, paying attention to the stabilization of 2-aminocyclohexanone, but the maximum yield (total yield in amination and oxime-formation steps) of 2-aminocyclohexanone oxime hydrochloride according to the two stage-process was not more than 54%. Therefore, when 2-chlorocyclohexanone is used as starting material, the simultaneous practice of amination and oxime-formation brings about marked advantages, contrary to the ordinary knowledge in the organic chemistry.

The 2-chlorocyclohexanone employed in the present invention is not required to be particularly high in purity. This compound is easily obtainable by chlorinating cyclohexanone according to ordinary procedure. The compound is also obtainable with ease by chlorinating a mixture of cyclohexanone and cyclohexanol.

As the hydroxylamine mineral acid salt, any of hydroxylamine hydrochloride and hydroxylamine sulfate may be used. However, the use of hydroxylamine hydrochloride is most preferable, because when hydroxylamine hydrochloride is used, the yield of the desired product is somewhat higher than in the case where hydroxylamine sulfate is used, an ammonium chloride is formed in the reaction product by virtue of chlorine released from the chlorocyclohexanone. When hydroxylamine sulfate is to be used, it would be effective for the improvement in yield to use in the reaction a solution prepared by ammonolyzing said salt in liquid ammonia and separating the formed ammonium sulfate by filtration.

As the liquid ammonia, any ordinary synthetic ammonia for industries (or fertilizers) may be used. However, the use of liquid ammonia containing more than 2–3% by weight of water is not desirable. When such water-containing ammonia is used, the reaction system becomes alkaline due to the presence of water and side reactions are promoted to bring about marked lowering in yield. Moreover, even when ammonia has been removed after completion of the reaction, water is present in addition to the reaction product, and a part of the by-produced ammonium salt is dissolved in the water to become inseparable from the oxime salt produced. This is because, the aminocyclohexanone oxime salt is easily soluble in water but is scarcely soluble in other solvents, though it is more or less soluble in methanol. The use of substantially anhydrous liquid ammonia brings about such advantages that the formation of by-products is inhibited, the removal of reaction solvent (i.e. excess liquid ammonia) becomes easy, the desired product is readily separated from the by-produced ammonium salt, and a high purity desired product can be obtained.

In practicing the present method, 2-chlorocyclohexanone, a hydroxylamine mineral acid salt and liquid ammonia are first charged in a pressure reactor. The 2-chlorocyclohexanone, hydroxylamine mineral acid salt and liquid ammonia may be independently charged in the reactor, or the 2-chlorocyclohexanone and hydroxylamine mineral acid salt are, respectively, dissolved in liquid ammonia and may be charged in the reactor. Further, the liquid ammonia may be gradually introduced into the reactor over a period of about 10–30 minutes, or may be introduced in a short period after cooling the reactor. Favorable results are liable to be obtained when the liquid ammonia is introduced in a short period.

The amount of hydroxylamine mineral acid salt to be added is 0.9–2.0 mols, preferably 0.9–1.2 mols, per mol of the 2-chlorocyclohexanone. In case the amount is less than 0.9 mol, the oxime-formation cannot be effected sufficiently, while in case the amount is more than 2 mols, the yield of the desired product is liable to be lowered due probably to the occurrence of side reactions which might be induced by addition of the large amount of said salt.

The amount of liquid ammonia to be used only for the reaction is 3 mols per mol of the 2-chlorocyclohexanone employed, i.e. 1 mol for amination, 1 mol for fixing released chlorine, and 1 mol for neutralizing the hydroxylamine mineral acid salt when 1 mol of hydroxylamine mineral acid is used. However, in order to make 1 mol of water formed by the reaction give no detrimental effect to the reaction, i.e. in order that the amount of formed water based on the amount of ammonia be made so small as to be negligible, and in view of the fact that the use of liquid ammonia as reaction solvent has favorable effect on the yield, the amount of liquid ammonia empolyed is 10–100 mols, preferably 20–60 mols, per mole of 2-chlorocyclohexanone.

In addition to the three starting materials mentioned above, about 1–15% by weight based on 2-chlorocyclohexanone of such a polymerization inhibitor as hydroquinone or pyrogallol is desirably added in order to inhibit side reactions due to polymerization, whereby the yield of the desired product is effectively improved. Particularly, hydroquinone gives favorable results.

After charging the above-mentioned starting materials into the reactor, the reactor is closed and the mixture is reacted at 0°–132° C. for 15 minutes—24 hours under spontaneous pressure. It is particularly preferable from the industrial standpoint to effect the reaction at 60°–100° C. for 30 minutes—6 hours. In the case where the reaction is effected for a period longer than the above range, side reactions proceed, i.e. octahydrophenazine is formed, and the yield is undesirably lowered.

The following process is most desirable in a commercial production. After completion of the reaction, excess ammonia is removed by vaporization, and the desired product is obtained as 2-aminocyclohexanone oxime hydrochloride after removal of by-produced inorganic salts by neutralization.

Concretely, the 2-aminocyclohexanone oxime hydrochloride is recovered, for example, in the following manners:

In order to efficiently withdraw the reaction product from the reactor, a solvent having a boiling point below 130° C. at atmospheric pressure, such as anhydrous acetone, anhydrous ethanol, anhydrous propanol or anhydrous butanol (this solvent will be referred to as the first solvent, hereinafter) is added to the reactor and then a mixture of the first solvent and the reaction product is taken out of the reactor. As the first solvents, anhydrous acetone and anhydrous ethanol are particularly preferable. Since methanol more or less dissolves ammonium salt, the use thereof as the first solvent is not desirable when a high purity product is desired to be obtained.

To the mixture of the reaction product and the first solvent, a dry hydrogen gas-injected solvent having a boiling point below 130° C. at atmospheric pressure, such as anhydrous ethanol, anhydrous propanol, anhydrous butanol or anhydrous acetone (this solvent will be referred to as the second solvent, hereinafter) is added to neutralize the mixture to a pH of about 7.0–7.2, whereby a precipitate of ammonium salt is further deposited. In place of adding the dry hydrogen chloride gas-injected second solvent to the mixture of reaction product and first solvent, dry hydrogen chloride alone may be injected to the mixture of reaction product and first solvent. As the second solvent, anhydrous ethanol is the most preferable in view of its ability of dissolving hydrogen chloride. Since methanol more or less dissolves the ammonium salt, the use thereof as the second solvent is not desirable when a high purity product is desired to be obtained.

Alternatively, there may be adopted such a procedure that the mixture of reaction product and first solvent is once filtered to separate the insoluble ammonium salt and then the dry hydrogen chloride-incorporated second solvent (or dry hydrogen chloride alone) is added to the filtrate to neutralize the same. The adoption of this procedure is disadvantageous from the industrial standpoint, since one stage of filtration step is added to the process.

Subsequently, the neutralized mixture of reaction product and first solvent is filtered to separate the insoluble ammonium salt. Thereafter, a dry hydrogen chloride-injected solvent having a boiling point below 130° C. at atmospheric pressure, such as anhydrous ethanol, anhydrous propanol, anhydrous butanol or anhydrous acetone, is further added to the filtrate to acidify the same to a pH of about 2.0–3.0, whereby a precipitate is formed. (In this case also, dry hydrogen chloride may be injected, like in the foregoing neutralization step. Further, anhydrous ethanol is the most preferable as the solvent employed, like in the foregoing step.)

The precipitate formed is separated by filtration, and the cake is washed with acetone or the like and is then dried to obtain 2-aminocyclohexanone oxime hydrochloride (primary crystals).

Further, the filtrate and the wash liquid are united and the resulting liquid is freed at a temperature below 60° C. from water and the used solvents such as acetone, ethanol and the like. To the resultant, a solvent such as anhydrous acetone or ethanol is freshly added and the liquid is refluxed. Thereafter, a precipitate formed is filtered, then washed with hot acetone or the like and then dried to obtain 2-aminocyclohexanone oxime hydrochloride (secondary crystals).

Both the primary and secondary crystals are white and have a purity of about 98—99%.

The present invention will be illustrated in detail below with reference to examples, but the examples are only illustrative and do not limit the scope of the invention.

Example 1

Into a 600 cc. stainless autoclave, 50 g. of 2-chlorocyclohexanone, 5.0 g. of hydroquinone as a stabilizer and 26.6 g. of hydroxylamine hydrochloride were charged, and the autoclave was closed. After reducing the pressure inside the system, the autoclave was cooled with Dry Ice to about 0° to −10° C. Into the autoclave, 520 cc. of liquid ammonia was introduced from a cylinder. (In the above, the molar ratio of 2-chlorocyclohexanone:hydroxylamine hydrochloride:liquid ammonia was 1:1:49.) The autoclave was heated in a water bath, with agitation. After the inner temperature of the autoclave had become 92° C. [at this time, the inner pressure of the autoclave had become 50 kg./cm.$^2$ (gauge)], the autoclave was maintained at said temperature for 3 hours. Thereafter, the autoclave was cooled with water. When the inner temperature of the autoclave had become about 50° C., excess ammonia was blown out for about 20 minutes. Subsequently, the interior of the autoclave was purged for 30 minutes by means of a vacuum pump to remove a major portion of ammonia. The autoclave was cooled with Dry Ice and was then opened. To the autoclave, 200 cc. of anhydrous acetone was added and a mixture of the reaction mixture and the anhydrous acetone was taken out. To this anhydrous acetone-reaction product mixture, dry hydrogen chloride-injected anhydrous ethanol (hydrochloric acid concentration: about 0.007 mol./cc.) was added to neutralize the mixture to a pH of 7.1. Subsequently, acetone-insoluble ammonium chloride was separated by filtration. To the filtrate, said hydrogen chloride-incorporated ethanol was added. When the pH of the filtrate become about 6, crystals began to deposit. When the pH became 2.6, the addition of hydrogen chloride-incorporated ethanol was discontinued. After allowing the mixture to stand for 1 hour, the deposited crystals were recovered by filtration under reduced pressure. The crystals were washed with acetone and were dried to obtain 49.2 g. of primary crystals of 2-aminocyclohexanone oxime hydrochloride. The filtrate and the wash liquid were united, and the mixture was freed at about 50° C. from acetone, ethanol and water. To the resultant, anhydrous acetone was freshly added and the liquid was refluxed. Deposited crystals were filtered, washed with hot acetone and dried to obtain 4.2 g. of secondary crystals of 2-aminocyclohexanone oxime hydrochloride. (Total yield: 86.1 mol percent.)

Example 2

Operations were effected under the same conditions as in Example 1, except that no hydroquinone was added, to obtain 46.2 g. of first crystals and 4.3 g. of second crystals of 2-aminocyclohexanone oxime hydrochloride. (Total yield: 81.3 mol percent.)

Example 3

Into a 500 cc. stainless autoclave, 50 g. of 2-chlorocyclohexanone, 1.0 g. of hydroquinone as a stabilizer and 26.6 g. of hydroxylamine hydrochloride were charged, and the autoclave was closed. After reducing the pressure inside the system, the autoclave was cooled with Dry Ice to about 0° to −10° C., and 350 cc. of liquid ammonia was introduced from a bomb into the autoclave. The autoclave was heated in a water bath, with agitation. After the inner temperature of the autoclave had become 64° C. [at this time, the inner pressure of the autoclave became 30 kg./cm.$^2$ (gauge)], the autoclave was maintained at said temperature for 5 hours. Thereafter, the same operations as in Example 1 were repeated to obtain 47.8 g. of primary crystals and 2.7 g. of secondary crystals of 2-aminocyclohexanone oxime hydrochloride. (Total yield: 81.3 mol percent.)

Example 4

Into a 500 cc. stainless autoclave, 50 g. of 2-chlorocyclohexanone and 32.0 g. of hydroxylamine hydrochloride, and the autoclave was closed. After reducing the pressure inside the system, the autoclave was cooled with Dry Ice and 250 cc. of liquid ammonia was introduced from a bomb. The inner temperature of the autoclave was maintained at 26° C. [at this time, the inner pressure of the autoclave became 10 kg./cm.$^2$ (gauge)] for 10 hours, with agitation. Thereafter, the same operations as in Example 1 were repeated to obtain 45.0 g. of primary crystals and 2.8 g. of secondary crystals of 2-aminocyclohexanone oxime hydrochloride. (Total yield: 77.1 mol percent.)

Example 5

Into a 500 cc. stainless autoclave, 50 g. of 2-chlorocyclohexanone, 5.0 g. of hydroquinone and 31.1 g. of hydroxylamine sulfate were charged, and the autoclave was closed. After reducing the pressure inside the system, the autoclave was cooled with Dry Ice and 200 cc. of liquid ammonina was introduced from a cylinder. The autoclave was heated in a water bath, with agitation. After the inner temperature of autoclave had become 92° C. [at this time, the inner pressure of the autoclave had become 50 kg./cm.$^2$ (gauge)], the autoclave was maintained at said temperature for 3 hours. Thereafter, the same operations as in Example 1 were repeated to obtain 48.9 g. of primary crystals and 3.3 g. of secondary crystals of 2-aminocyclohexanone oxime hydrochloride. (Total yield: 84.2%.)

What we claim is:

1. A method for preparing 2-aminocyclohexanone oxime which comprises maintaining and reacting in a closed vessel 2-chlorocyclohexanone and a hydroxylamine mineral acid salt selected from the group consisting of hydroxylamine hydrochloride and sulfate at a temperature of 0°–132° C. for a period of 15 minutes—24 hours in the presence of liquid ammonia in excess of the theoretical amount and then removing excess ammonia by vaporization.

2. A method according to claim 1, wherein the molar ratio of 2-chlorocyclohexanone, hydroxylamine mineral acid salt and liquid ammonia is 1:0.9–2.0:10–100.

3. A method according to claim 1, wherein the 2-chlorocyclohexanone, hydroxylamine mineral acid salt and liquid ammonia in excess of the theoretical amount are reacted in the presence of, as a polymerization inhibitor, 1–15% by weight based on the 2-chlorocyclohexanone of a compound selected from the group consisting of hydroquinone and pyrogallol.

4. A method for preparing 2-aminocyclohexanone oxime which comprises maintaining and reacting in a closed vessel 2-chlorocyclohexanone and a hydroxylamine mineral acid salt selected from the group consisting of hydroxylamine hydrochloride and sulfate at a temperature of 60°–100° C. for a period of 30 minutes—6 hours in the presence of liquid ammonia in excess of the theoretical amount and then removing excess ammonia by vaporization.

5. A method according to claim 4, wherein the molar ratio of 2-chlorocyclohexanone, hydroxylamine mineral acid salt and liquid ammonia is 1:0.9–1.2:20–60.

6. A method according to claim 4, wherein the 2-chlorocyclohexanone, hydroxylamine mineral acid salt and liquid ammonia in excess of the theoretical amount are reacted in the presence of, as a polymerization inhibitor, 1–15% by weight based on the 2-chlorocyclohexanone of a compound selected from the group consisting of hydroquinone and pyrogallol.

7. A method for preparing 2-aminocyclohexanone oxime hydrochloride which comprises maintaining and reacting in a closed vessel 2-chlorocyclohexanone and a hydroxylamine mineral acid salt selected from the group consisting of hydroxylamine hydrochloride and sulfate at a temperature of 0°–132° C. for a period of 15 minutes—24 hours in the presence of liquid ammonia in excess of the theoretical amount, removing excess ammonia by vaporization and then separating and removing ammonium salt by use of anhydrous hydrogen chloride and an inert solvent having a boiling point below 130° C.

8. A method according to claim 7, wherein the molar ratio of 2-chlorocyclohexanone, hydroxylamine mineral acid salt and liquid ammonia is 1:0.9–2.0:10–100.

9. A method according to claim 7, wherein the 2-chlorocyclohexanone, hydroxylamine mineral acid salt and liquid ammonia in excess of the theoretical amount are reacted in the presence of, as a polymerization inhibitor, 1–15% by weight based on the 2-chlorocyclohexanone of a compound selected from the group consisting of hydroquinone and pyrogallol.

10. A method according to claim 7, wherein the inert solvent having a boiling point below 130° C. is at least one member selected from the group consisting of anhydrous acetone, anhydrous ethanol, anhydrous propanol and anhydrous butanol.

11. A method for preparing 2-aminocyclohexanone oxime hydrochloride which comprises maintaining and reacting in a closed vessel 2-chlorocyclohexanone and a hydroxylamine mineral acid salt selected from the group consisting of hydroxylamine hydrochloride and sulfate at a temperature of 60°–100° C. for a period of 30 minutes—6 hours in the presence of liquid ammonia in excess of the theoretical amount, removing excess ammonia by vaporization, and then separating and removing ammonium salt by use of anhydrous hydrogen chloride and an inert solvent having a boiling point below 130° C.

12. A method according to claim 11, wherein the molar ratio of 2-chlorocyclohexanone, hydroxylamine mineral acid salt and liquid ammonia is 1:0.9–1.2:20–60.

13. A method according to claim 11, wherein the 2-chlorocyclohexanone, hydroxylamine mineral acid salt and liquid ammonia in excess of the theoretical amount are reacted in the presence of, as a polymerization inhibitor, 1–15% by weight based on the 2-chlorocyclohexanone of a compound selected from the group consisting of hydroquinone and pyrogallol.

14. A method according to claim 11, wherein the inert solvent having a boiling point below 130° C. is at least one member selected from the group consisting of anhydrous acetone, anhydrous ethanol, anhydrous propanol and anhydrous butanol.

15. A method for preparing 2-aminocyclohexanone oxime hydrochloride which comprises charging in a reactor 2-chlorocyclohexanone, a hydroxylamine mineral acid salt selected from hydroxylamine hydrochloride and sulfate and liquid ammonia in a molar ratio in the range of 1:0.9–2.0:10–100, maintaining the above compounds in the reactor at a temperature of 0°–132° C. for a period of from 15 minutes to 24 hours, removing excess ammonia by vaporization, adding to the reactor at least one solvent selected from the group consisting of anhydrous acetone, anhydrous ethanol, anhydrous propanol and anhydrous butanol, withdrawing from the reactor a mixture of said solvent and the reaction product, adding to said mixture at least one solvent selected from the group consisting of anhydrous ethanol, anhydrous propanol, anhydrous butanol and anhydrous acetone, said solvent containing hydrogen chloride dissolved therein, thereby neutralizing the mixture to a pH of 7–7.2, separating the formed insoluble ammonium salt by filtration, adding to the filtrate at least one solvent selected from the group consisting of anhydrous ethanol, anhydrous propanol, anhydrous butanol and anhydrous acetone, said solvent containing hydrogen chloride dissolved therein, thereby acidifying the filtrate to a pH of 2.6–3.0, separating the formed precipitate by filtration, washing the precipitate with acetone, drying the washed precipitate to obtain a major proportion of the desired product, uniting the filtrate and the wash liquid, removing the solvent from the mixture at a temperature below 60° C., adding to the mixture a solvent selected from the group consisting of anhydrous acetone and anhydrous ethanol, refluxing the mixture, filtering the formed precipitate and then drying the precipitate to obtain a minor proportion of the desired product.

16. A method according to claim 15, wherein to the 2-chlorocyclohexanone, hydroxylamine mineral acid salt and liquid ammonia is further added 1–15% by weight based on the 2-chlorocyclohexanone of hydroquinone.

17. A method according to claim 15, wherein in effecting the neutralization of the mixture of reaction product and solvent and the acidification of the filtrate, anhydrous hydrogen chloride alone is used in place of the anhydrous ethanol containing hydrogen chloride dissolved therein.

18. A method for preparing 2-aminocyclohexanone oxime hydrochloride which comprises charging in a reactor 2-chlorocyclohexanone, a hydroxylamine mineral acid salt selected from the group consisting of hydroxylamine hydrochloride and sulfate, and liquid ammonia in a molar ratio in the range of 1:0.9–1.2:20–60, maintaining the above compounds in the reactor at a temperature of 60°–100° C. for a period of 30 minutes—6 hours, removing excess liquid ammonia by vaporization, adding to the reactor a solvent selected from the group consisting of anhydrous acetone and anhydrous ethanol, withdrawing from the reactor the resulting mixture of said solvent and the reaction product, adding to said mixture anhydrous ethanol containing hydrogen chloride dissolved therein, thereby neutralizing the mixture to a pH of 7.0–7.2, separating the formed insoluble ammonium salt by filtration, adding to the filtrate anhydrous ethanol containing hydrogen chloride dissolved therein, thereby acidifying the filtrate to a pH of 2.6–3.0, separating the formed precipitate by filtration, washing the filtrate with acetone, drying the washed precipitate to obtain a major proportion of the desired product, uniting the filtrate and the wash liquid, removing the solvent from the mixture at a temperature below 60° C., adding to the mixture a solvent selected from the group consisting of anhydrous acetone and anhydrous ethanol, refluxing the liquid, and then filtering and drying the formed precipitate to obtain a minor proportion of the desired product.

19. A method according to claim 18, wherein to the 2-chlorocyclohexanone, hydroxylamine mineral acid salt and liquid ammonia is further added 1–15% by weight based on the 2-chlorocyclohexanone of hydroquinone.

20. A method according to claim 18, wherein in effecting the neutralization of the mixture of reaction product and solvent and the acidification of the filtrate, anhydrous hydrogen chloride alone is used in place of the anhydrous ethanol containing hydrogen chloride dissolved therein.

References Cited

UNITED STATES PATENTS 2,490,385   12/1949   Sweet.

FOREIGN PATENTS 447,113   3/1948   Canada.

LEON ZITVER, *Primary Examiner.*

MATTHEW M. JACOB, *Assistant Examiner.*

U.S. Cl. X.R.

260—563, 267, 586.